US009747514B2

United States Patent
Lim et al.

(10) Patent No.: US 9,747,514 B2
(45) Date of Patent: Aug. 29, 2017

(54) NOISE FILTERING AND IMAGE SHARPENING UTILIZING COMMON SPATIAL SUPPORT

(71) Applicant: Apple Inc., Cupertino, CA (US)

(72) Inventors: Suk Hwan Lim, Mountain View, CA (US); David R. Pope, Fremont, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 14/841,406

(22) Filed: Aug. 31, 2015

(65) Prior Publication Data

US 2017/0061234 A1    Mar. 2, 2017

(51) Int. Cl.
| | |
|---|---|
| G06K 9/40 | (2006.01) |
| G06K 9/46 | (2006.01) |
| G06T 5/00 | (2006.01) |
| G06T 3/40 | (2006.01) |

(52) U.S. Cl.
CPC ......... *G06K 9/4661* (2013.01); *G06K 9/4652* (2013.01); *G06T 3/40* (2013.01); *G06T 5/00* (2013.01)

(58) Field of Classification Search
CPC ...... G06K 9/4661; G06K 9/4652; G06K 9/40; G06T 3/40; G06T 5/00
USPC ................. 382/190, 254, 266, 275
See application file for complete search history.

(56) References Cited

U.S. PATENT DOCUMENTS

| | | | |
|---|---|---|---|
| 5,363,209 A | 11/1994 | Eschbach et al. | |
| 6,453,068 B1 * | 9/2002 | Li | ............... G06T 5/002 358/1.9 |
| 7,088,351 B2 * | 8/2006 | Wang | ............... H04N 5/208 345/204 |
| 7,265,784 B1 | 9/2007 | Frank | |
| 7,599,569 B2 * | 10/2009 | Smirnov | ............... G06K 9/40 382/260 |
| 7,907,791 B2 * | 3/2011 | Kinrot | ............... G06T 1/0007 382/276 |
| 8,144,253 B2 * | 3/2012 | Su | ............... G06T 5/002 348/575 |
| 8,854,421 B2 * | 10/2014 | Kasahara | ............... B60R 1/00 348/222.1 |
| 2011/0150332 A1 | 6/2011 | Sibiryakov et al. | |
| 2014/0192267 A1 | 7/2014 | Biswas et al. | |
| 2016/0284065 A1 * | 9/2016 | Cohen | ............... G06T 5/002 |

* cited by examiner

*Primary Examiner* — Daniel Mariam
(74) *Attorney, Agent, or Firm* — Robert C. Kowert; Meyertons, Hood, Kivlin, Kowert & Goetzel, P.C.

(57) ABSTRACT

An image processing pipeline may perform noise filtering and image sharpening utilizing common spatial support. A noise filter may perform a spatial noise filtering technique to determine a filtered value of a given pixel based on spatial support obtained from line buffers. Sharpening may also be performed to generate a sharpened value of the given pixel based on spatial support obtained from the same line buffers. A filtered and sharpened version of the pixel may be generated by combining the filtered value of the given pixel with the sharpened value of the given pixel. In at least some embodiments, the noise filter performs spatial noise filtering and image sharpening on a luminance value of the given pixel, when the given pixel is received in a luminance-chrominance encoding.

20 Claims, 7 Drawing Sheets

NOISE FILTERING AND IMAGE SHARPENING UTILIZING COMMON SPATIAL SUPPORT

BACKGROUND

Image data captured by an image sensor is often initially processed as part of an image processing pipeline in order to prepare the captured image data for further processing or consumption. In this way, real-time corrections or enhancements can be made without consuming other system resources. For example, raw image data may be corrected, filtered, or otherwise modified to provide subsequent components, such as a video encoder, with appropriately scaled image data for encoding and subsequent display, reducing a number of subsequent operations to be performed on the image data at the video encoder.

In order to implement these corrections or enhancements for captured image data, various different devices, components, units, or other modules may be used to implement the varying operations performed as part of an image processing pipeline. An image signal processor, for instance, may include multiple different units or stages at which different image modifications or enhancements can be made to image data obtained from an image sensor. Given the ubiquity of image sensors in many different products, efficiently handling image data as part of an image processing pipeline may confer relief on those products with constrained resources for performing additional tasks.

SUMMARY

An image signal processor of a device, apparatus, or computing system that includes a camera or other image sensor capable of capturing image data may, in some embodiments, be configured to perform noise filtering and image sharpening of image data using common spatial support. Noise filtering techniques and image sharpening techniques may rely on information about other portions of an image frame in addition to a given pixel of the image frame that is received for noise filtering and image sharpening (e.g., a neighborhood of pixels surrounding the given pixel). In order to access the other portions of the image data, line buffers may be implemented to store portions of image data. The same line buffers may be used to provide information about the other portions of the image frame for both noise filtering and image sharpening.

Figure 1:
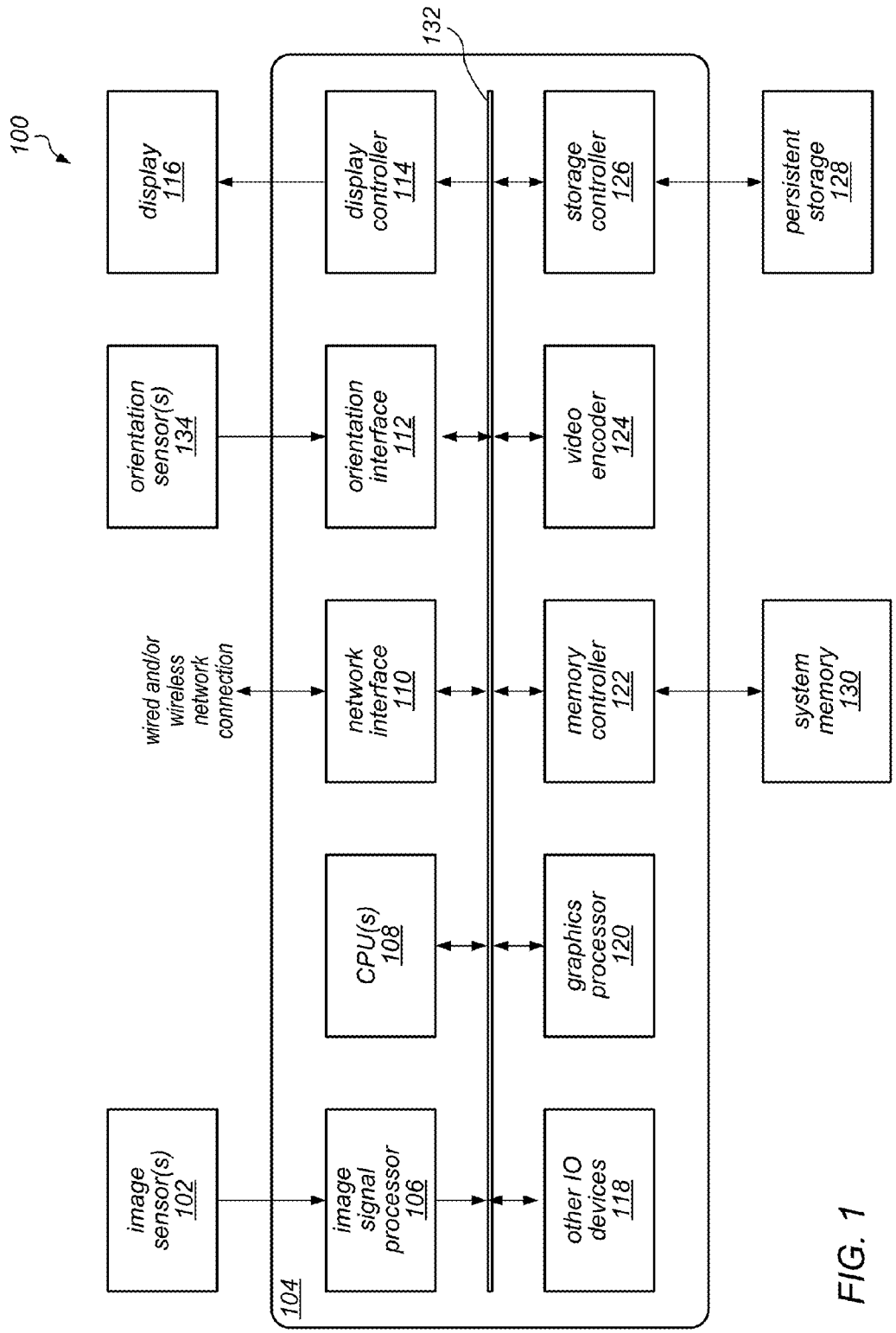
FIG. 1 is a logical block diagram illustrating an example system that may implement an image processing pipeline that performs noise filtering and image sharpening utilizing common spatial support, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

An image signal processor or other image processing pipeline may implement many different techniques or components to correct or enhance image data captured by an image sensor. For example, an image processing pipeline may implement noise filtering techniques to reduce noise (e.g., erroneous changes made to image data or an image signal during capture, transmission, processing, conversion or storage of the image data or image signal). Sharpening is another enhancement technique that may be implemented as part of an image processing pipeline to enhance edges within an image.

Spatial support is commonly utilized by different enhancement and correction techniques, such as noise filtering and image sharpening, in order to perform enhancements and corrections that are consistent with larger portions of the image (e.g., instead of performing enhancements or corrections based solely upon a single input pixel). Spatial support is typically implemented by one or more line buffers which store pixels for an area of an image in a buffer so that the pixel values may be accessible to perform various comparative operations as part of correction and enhancement techniques. For example, line buffers may store several lines of pixel data the entire width of an image frame. The number of stored lines in the line buffers may be determined according to the amount of vertical information or height required for supporting the correction and enhancement techniques. Utilizing line buffers to provide spatial support is costly in terms of power usage and increased area on circuitry implementing noise filtering and image sharpening. Therefore, implementing noise filtering and image sharpening utilizing common spatial support, such as common line buffers, increases the efficiency of image processing when performing both noise filtering and image sharpening.

The techniques described herein for processing image data in an image processing pipeline that performs noise filtering and image sharpening utilizing common spatial support may be further illustrated in terms of an example system that employs them. As noted above, these techniques may be implemented in any type of camera, apparatus, or computing system that includes the capability to capture and process image data, including video clips.

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes image sensor(s) 102, a system-on-a chip (SOC) component 104, system memory (e.g., DRAM) 130, persistent storage (e.g., flash memory) 128, and a display 116 (e.g., LCD or OLED). In this example, image sensor(s) 102 may be any type of image sensor suitable for capturing image data (e.g., an image sensor that is responsive to captured light), such as an active-pixel sensor (e.g., complementary metal-oxide-semiconductor (CMOS) active-pixel sensor) on a camera, video camera, or other device that includes a camera or video camera. In this example, display 116 may be configured to display a preview of captured still images or video clips (which may be provided as output from image signal processor 106). Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, orientation interface 112 (which may be coupled to orientation sensor(s) 134 from which system 100 orientation data, such as motion data, may be gathered), a display controller 114 (which may be coupled to and control the operations of display 116), a graphics processor (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 or SOC component 104 may include more or fewer elements than those shown in FIG. 1.

In various embodiments, SOC component 104 may be a uniprocessor system including one processor, or a multiprocessor system including several processors or several processing cores (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, RISC, ARM™, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, superpipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile computing device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including display 116 or video encoder 124). In some embodiments, ISP 106 may be configured to perform various image-manipulation operations such as image translation operations, horizontal and vertical scaling, color space conversion or other non-warping image editing operations, or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. For example, video or other image data may be received from other devices (e.g., a content provider network or another mobile computing device) via network interface 110 and be stored in system memory 130 for subsequent processing (e.g., via a back-end interface to image signal processor 106, such as discussed below in FIG. 3) and display. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions stored in system memory 130 may be executed by CPU 108 or GPU 120 to provide various functions of system 100.

In other embodiments, various functions may be performed by software components executing in memory on another device and communicating with the illustrated system via inter-computer communication. Some or all of these software components or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
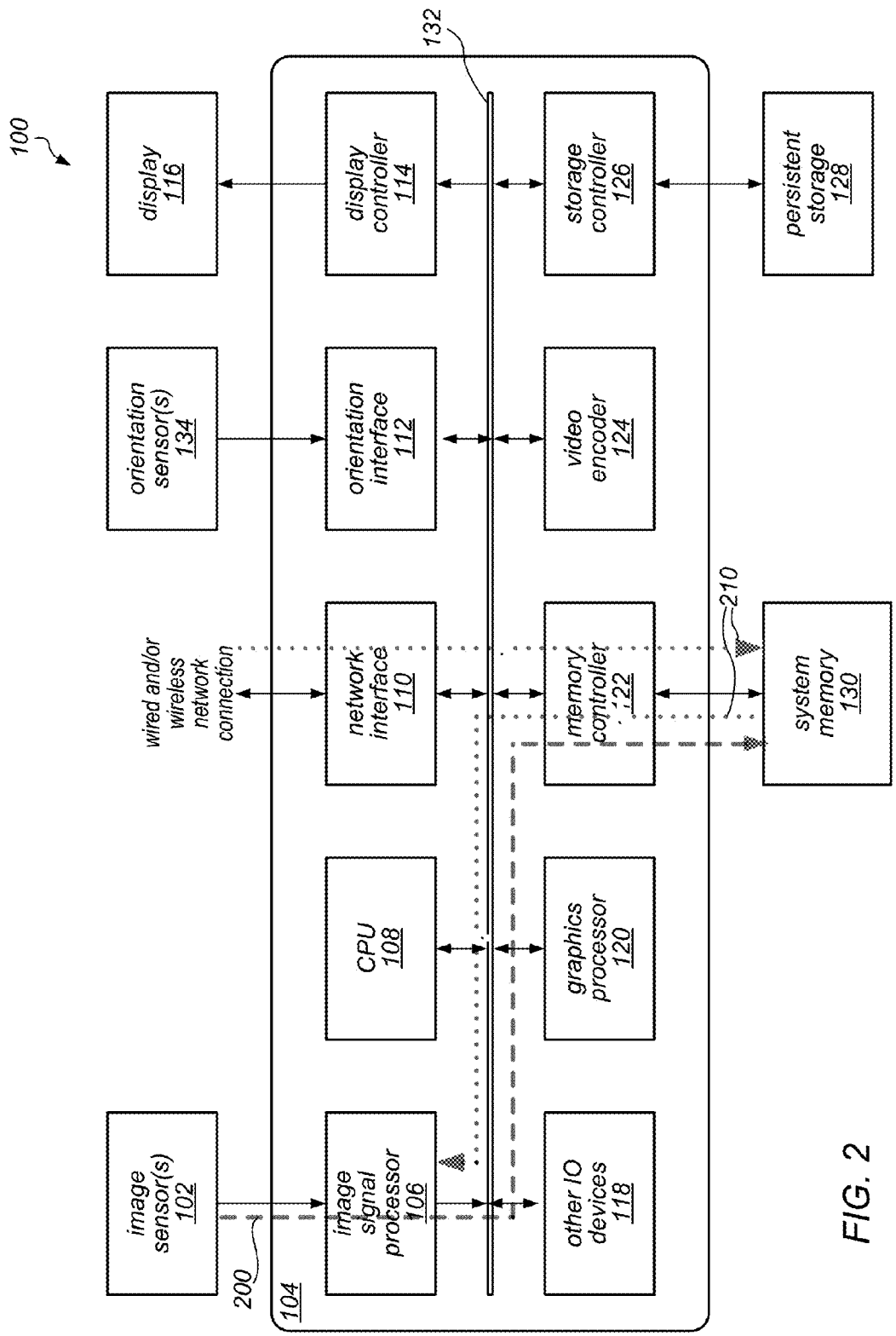
FIG. 2 is a logical block diagram illustrating example data paths in a system that may implement an image processing, according to some embodiments.

FIG. 2 is a block diagram illustrating data paths in a system that implements an image signal processor (specifically, in system 100 illustrated in FIG. 1), according to some embodiments. As illustrated by the dashed lines in one example, image data may pass from the image sensor (102), through the image signal processor (106) to system memory 130 (by way of interconnect 132 and memory controller 122). Once the image data has been stored in system memory 130, it may be accessed by video encoder 124, display 116 (e.g., by way of interconnect 132 and, in the case of display 116, display controller 114). For example, it may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

Another example data path is illustrated by the dotted lines 210. Image data, such as video image or data or image stills or frames, may be received by system 100 from sources other than the image sensor(s) 102. For example, video data may be streamed, downloaded, or otherwise communicated to the system 100 via wired or wireless network connections from other sources remote to system 100 (e.g., a content provider network or other mobile computing device). The image data may be received via network interface 110 and written to memory 130 via memory controller 122. The image data may then be obtained by image signal processor 106 from memory 130 and processed through one or more image processing pipeline stages, in some embodiments, to perform various image correction, translation, conversion, or other image processing techniques. The image data may then be returned to memory 130, video encoder 124, or other component such as display controller 113 for display at display 116 or to storage controller 126 for storage at persistent storage 128 (not illustrated).

In some embodiments graphics processor 120 may access, manipulate, transform or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 126, or display controller 114) without storing the image data to system memory 130.

Figure 3:
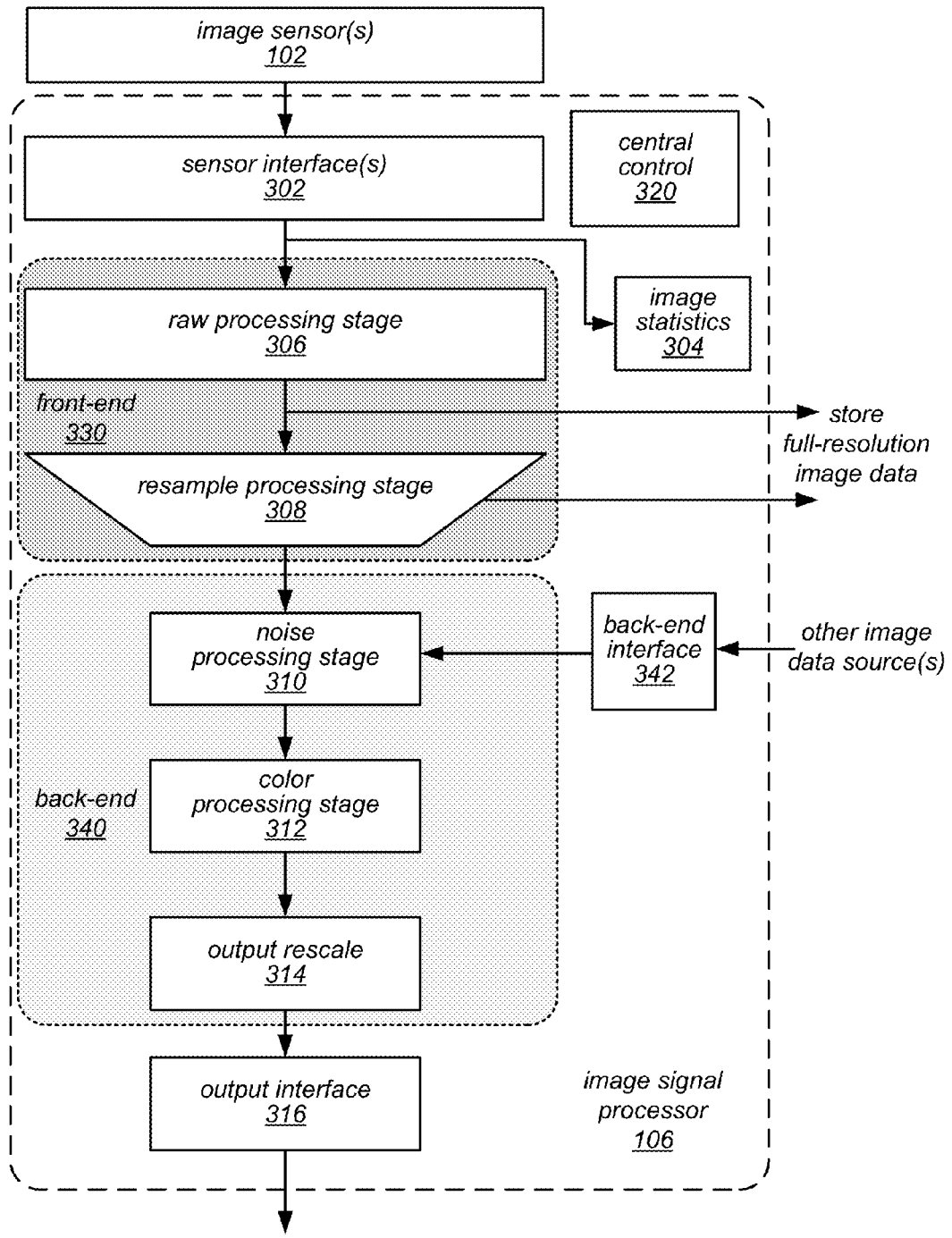
FIG. 3 is a logical block diagram illustrating an example image signal processor, according to some embodiments.

One embodiment of an image signal processing unit (ISP), such as image signal processor 106, is illustrated by the block diagram in FIG. 3. As illustrated in this example, ISP 106 may in various embodiments be coupled to image sensor(s) 102 (from which it receives image data). In this example, ISP 106 implements an image processing pipeline which may include a set of stages that process image information from creation, capture, or receipt to output. For example, the various elements illustrated as components of ISP 106 process source data received from image sensor 102 through sensor interface(s) 302 into image data processable by other stages in the pipeline (e.g., image statistics 304, raw image processing 306, resample processing stage 308, noise processing stage 310, color processing stage 312, or output rescale 314), by other components of a system that includes ISP 106 via output interface 316 (including those that access the transformed data from the system memory after it is written to the system memory via memory controller interface 122 or are provided the image data via interconnect 132 directly) or back-end interface 342, or by other devices coupled to the system that includes ISP 106. In at least some embodiments, sensor interface(s) 302 may perform various preprocessing operations, such as pixel defect correction to detect and correct patterned defects and defect line pairs (e.g., created by special pixels like focus pixels), and image cropping or binning to reduce image data size. Note that in some embodiments, the image signal processor 106 is a streaming device. In other words, pixels may be received by the image signal processor 106 from the image sensor 102 via sensor interface(s) 302 in raster order (i.e., horizontally, line by line) and may in general be processed through its various pipeline stages in raster order, until finally being output in raster order.

Image signal processor 106 may process image data received at image signal processor (sometimes referred to as an ISP) at different rates. For example, in the example embodiment illustrated in FIG. 3, image signal processor may implement one or more front-end pipeline stages 330, such as raw processing stage 306 and resample processing stage 308, which process image data at an initial rate. Thus, the various different techniques, adjustments, modifications, or other processing operations performed at these front-end pipeline stages (such as those described below with respect to raw processing stage 306 and resample processing stage 308) may be implemented so that the image data may be continuously processed through these stages at the initial rate. For example, if the front-end pipeline stages 330 process 2 pixels per clock cycle, then raw processing stage 306 operations like black level compensation, highlight recovery, defective pixel correction, and others, may process 2 pixels of image data at a time.

In addition to processing the image data at front-end pipeline stages at an initial rate, image signal processor 106 may implement one or more back-end pipeline stages that process image data a different rate. The back-end pipeline stages 340 may, in various embodiments, process image data at a reduced rate that is less than the initial data rate. For example, as illustrated in FIG. 3, back-end pipeline stages 340, such as noise processing stage 310, color processing stage 312, and output rescale 314, may be implemented so that the image data is processed according to the reduced rate. Given the above example of front-end stages 330 processing image data at 2 ppc, then noise processing stage 310 may implement operations such as temporal filtering and luma sharpening to process image data at a rate less than 2 ppc, such as 1 ppc.

In at least some embodiments, image signal processor 106 may implement back-end interface 342. Back-end interface 342 may receive image data from other image sources than image sensor(s) 102. For instance, as illustrated in FIG. 2, image data received over a wireless connection may be received and stored in memory 130. The image data may be received through back-end interface 342 for processing at back-end stages 340 of image signal processor 106. In this way, image signal processor 106 can be configured to provide resource efficient image processing capacity to data received from other image data source(s) instead of (or in addition to) CPU or GPU processing performed on the image data. In various embodiments, back-end interface 342 may convert image data to a format that is utilized by back-end processing stages. For instance, back-end interface 342 may convert RGB, YCbCr 4:2:0, or YCbCr 4:2:2 formatted image data into YCbCr 4:4:4 color format. Please note that back-end interface 342 may convert from various color formats, and thus the previous examples are not intended to be limiting.

In various embodiments, image signal processor 106 may implement central control module 320. Central control module 320 may configure and start the processing of image data, in some embodiments. For example, central control module 320 may implement performance monitors for logging clock cycles, memory latency, quality of service, and state information. Central control module 320 may update or manage control parameters for units, modules, stages, or other components of ISP 106, and may interface with sensor interface 302 to control the starting and stopping of the of the units, modules, stages, or other components. For example, in some embodiments, a unit, module, stage, or other component may go into an idle state during which programmable parameters may be updated by central control module 320. The unit, module, stage, or other component may then be placed into a run state, to perform one or more operations or tasks. In other examples, central control module 320 may configure image signal processor 106 to store image data (e.g., to be written to a memory, such as memory 130 in FIG. 2) before, during, or after resample processing stage 308. In this way full-resolution image data whether in raw or full-color domain format may be stored in addition to or instead of processing the image data output from resample processing stage 308 through backend pipeline stages.

In various embodiments, image signal processor 106 may implement image statistics module(s) 304. Image statistics module(s) 304 may perform various functions and collect information. For example image statistics module may, in some embodiments perform sensor linearization, defective pixel replacement, black level compensation, lens shading correction, and inverse black level compensation in order to collect image information as a result of the various operations. Other statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting. In some embodiments, certain pixels' values, or areas of pixel values may be excluded from statistics collections, such as from AF statistics, when the statistics operations like sensor linearization, defective pixel replacement, black level compensation, lens shading correction, and inverse black level compensation identify clipped pixels. In scenarios where multiple image statistics modules 304 are implemented, each statistic module may be programmed by central control module 320 to collect different information for the same image data, or different image data collected for different images (e.g., collected from different ones of image sensor(s) 102).

As noted above, image signal processor 106 may implement one or multiple front-end pipeline stages, such as raw processing stage 306 and resample processing stage 308, which may process image data in raw or full-color domains. Raw processing stage 306 may, in various embodiments implement a variety of modules, units, or components to perform various operations, functions, or tasks on raw image data. Bayer raw format, for example, may be image data collected from image sensor(s) 102 that implement a Bayer pattern of pixel sensors. For instance, some pixel sensors only capture green light, while other pixel sensors capture red or blue light in Bayer pattern of pixels. In this way, image data in Bayer raw image format (or other raw image format captured by a color filter array in an image sensor) provides pixel data with values specific to a particular color (instead of all colors).

Raw processing stage 306 may thus process image data in a raw format (such as Bayer raw format) applying various operations including, but not limited to, sensor linearization, black level compensation, fixed pattern noise reduction, defective pixel correction, raw noise filtering, lens shading correction, white balance gain, and highlight recovery. A sensor linearization unit may, in some embodiments, map non-linear image data to linear space for other processing (e.g., to convert image data from a companding format collected from a High Dynamic Range (HDR) image sensor which may be one of image sensor(s) 102). Black level compensation may, in some embodiments, be performed to provide digital gain, offset and clip independently for each color component (e.g., Gr, R, B, Gb) on the pixels' image data (which may occur after sensor linearization). In some embodiments, fixed pattern noise reduction may be performed to remove offset fixed pattern noise and gain fixed pattern noise by subtracting a dark frame from an input image and multiplying different gains to pixels, in some embodiments. Defective pixel correction may determine or identify defective pixels, and may replace defective pixel values, in various embodiments. Raw noise filtering may reduce noise of image data, in various embodiments, by averaging neighbor pixels that are similar in brightness. Highlight recovery may, in various embodiments, estimate pixel values for those pixels that are clipped (or nearly clipped) from other channels. Lens shading correction may apply a gain per pixel to compensate for a dropoff in intensity roughly proportional to a distance from a lens optical center. White balance gains may provide digital gains for white balance, offset and clip independently for all color components (e.g., Gr, R, B, Gb in Bayer format). Please note that various examples and descriptions provided above are not intended to be limiting as to the various techniques, components, or formats of raw processing stage 306 but are instead merely provided as examples. Various components, units, or modules may be broken apart into multiple different pipeline processing stages. Also note that in some embodiments, various ones of the components, units, or modules may convert raw image data into full-color domain, and thus raw processing stage 306 may, at various portions, process image data in the full-color domain in addition to or instead of raw image data. For instance, a simple demosaic unit may receive data from raw noise filtering and interpolate a full-color domain for raw image data to perform lens shading correction, white balance gain, or highlight recovery before converting the image data back to a raw image format.

In various embodiments, image signal processor 106 may implement resample processing stage 308. Resample processing stage 308 may perform various operations to convert, resample, or scale image data received from raw processing stage 306, as discussed in further detail below with regard to FIG. 4, and may provide as output image data accordingly at a reduced rate such as may be processed by a back-end pipeline stages 340. Please note, that in some embodiments, some or all of the portions of resample processing stage may be implemented as part of raw processing stage and thus the previous description is provided as an example pipeline stages in an image processing pipeline which may implement multi-rate processing for image data.

In various embodiments, image signal processor 106 may implement one or more back-end pipeline stages 340 to process image data at rate that is less than the initial rate for processing image data in front-end stages 330 (e.g., 4 ppc initial rate >3, 2, or 1 ppc reduced rate). In at least some embodiments, back-end pipeline stages 340 may process image data according to a particular full-color format (e.g., YCbCr 4:4:4 or RGB) in which resample processing stage 308 or back-end interface 342 may provide to back-end stages 340. Please note, that in some embodiments, various ones of the back-end stages 340 may be configured to convert image data to the particular full-color format (or may utilize different full-color formats for processing), and thus the previous example is not intended to be limiting.

Image signal processor 106 may implement noise processing stage 310, in some embodiments. Noise processing stage 310 may, in various embodiments implement a variety of modules, units, or components to perform various operations, functions, or tasks, in different orders, such as gamma/de-gamma mapping, color space conversion, temporal filtering, noise filtering, luma sharpening, and chroma noise reduction. Color space conversion may convert image data to another color format or space (e.g., RBG to YCbCr). Gamma mapping may provide non-linear mapping functions for particular color channels of pixel data (e.g., Y, Cb, and Cr channels) in order to apply different image effects, including, but not limited to, black and white conversion, sepia tone conversion, negative conversion, or solarize conversion). Temporal filtering may be performed, in various embodiments, to filter image signal noise based on pixel values from a previously filtered image frame. Pixel values from the previously filtered image frame (which may be referred to herein as the reference image frame), may be combined with pixel values of a current image frame to get a best estimate of the pixel values. For example, a temporal filter may average the pixel values in the current image frame and the corresponding pixels in the reference image frame when the current image frame and the reference image frame are similar. In at least some embodiments, temporal filtering may be performed upon individual color channel values. For instance, a temporal filter may filter Y color channel values (from image data in YCbCr format) with Y color channel values in the reference frame (without filtering on other channels like Cb or Cr).

Other noise filtering, such as spatial noise filtering may be performed. In at least some embodiments, luma sharpening and chroma suppression may be performed as part of spatial noise filtering in simultaneous or near simultaneous fashion, as discussed below with regard to FIGS. 4-7. Luma sharpening may sharpen luma values of pixel data, in some embodiments. Chroma suppression may attenuate chroma to gray (i.e. no color), in some embodiments. The aggressiveness of noise filtering may be determined differently for different regions of an image, in some embodiments. Spatial noise filtering may be included as part of a temporal loop implementing temporal filtering as discussed above. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame). Please note that various examples and descriptions provided above are not intended to be limiting as to the various techniques or components implemented as part of noise processing stage 310, but are instead merely provided as examples.

Image signal processor 106 may implement color processing stage 312, in some embodiments. Color processing stage 312 may, in various embodiments implement a variety of modules, units, or components to perform various operations, functions, or tasks, in different orders, such as local tone mapping, gain/offset/clip, color correction, three-dimensional color lookup, gamma conversion, and color space conversion. Local tone mapping may, in some embodiments, apply spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain, offset and clip may be provided for each color channel or component of image data, in some embodiments. Color correction may be implemented, in some embodiments, applying a color correction transform matrix to image data. 3D color lookup may utilize a three dimensional array of color component output values (e.g., R, G, B) to perform advanced tone mapping, color space conversions, and other color transforms, in some embodiments. Gamma conversion may be performed, mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

In various embodiments, image signal processor 106 may implement output rescale module 314. Output rescale module 314 may resample, transform and correct distortion on the fly as the ISP 160 processes image data. Output rescale module 314 may compute a fractional input coordinate for each pixel and uses this fractional coordinate to interpolate an output pixel via a polyphase resampling filter, in some embodiments. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may, in various embodiments, apply transforms to image data as it is processed at output rescale module 314. Output rescale module 314 may include horizontal and vertical scaling components. The vertical portion of the design may implement series of image data line buffers to hold the "support" needed by the vertical filter. As ISP 106 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may generate a best guess of where to center the vertical support window automatically. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 314 to various other components of system 100, as discussed above with regard to FIGS. 1 and 2.

Note also that, in various embodiments, the functionally of units 302-342 may be performed in a different order than the order implied by the order of these functional units in the image processing pipeline illustrated in FIG. 3, or may be performed by different functional units than those illustrated in FIG. 3. Moreover, the various components, units, processes, or other functionalities described in FIG. 3 (or subsequent FIGS. 4-7) may be implemented in various forms of hardware circuitry, software operating on hardware, or some combination of hardware and software.

Figure 4:
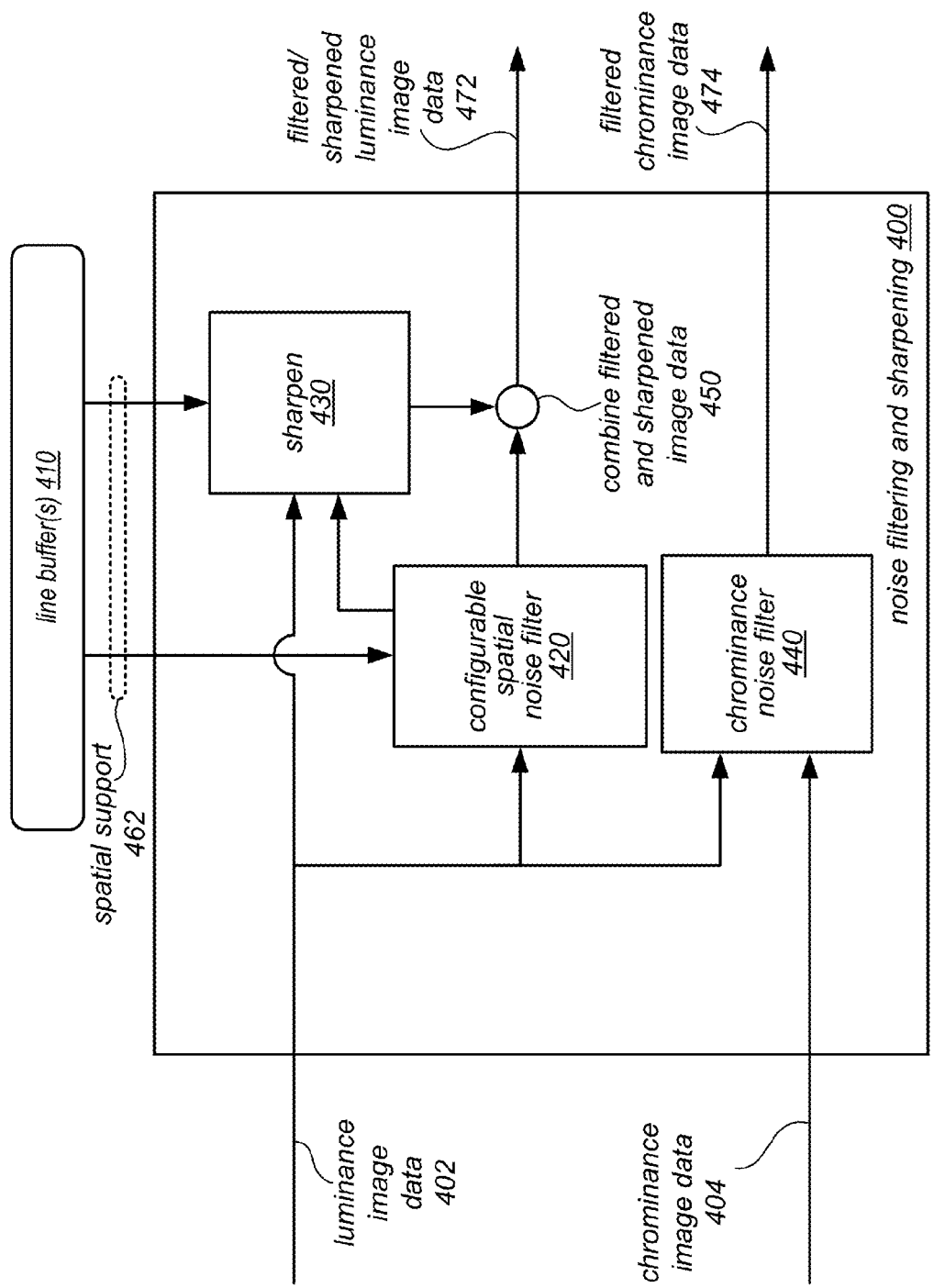
FIG. 4 is a logical block diagram illustrating an example noise filter that performs noise filtering and image sharpening utilizing common spatial support, according to some embodiments.

Noise filtering may be performed on image data converted into a full color encoding (e.g., YCbCr). For example, noise processing stage 310 may implement spatial noise filtering upon image data received at noise processing stage from resample processing stage 308 or from memory via backend interface 342, which has been or will be converted to a full color encoding, such as RGB or a luminance-chrominance encoding like YCbCr (as opposed a raw format like Bayer discussed above). In at least some embodiments, sharpening of image data may be combined with the performance of spatial noise filtering. FIG. 4 is a logical block diagram illustrating an example noise filter that performs noise filtering and image sharpening utilizing common spatial support, according to some embodiments.

Noise filtering and image sharpening unit 400 may be implemented as part of noise processing stage 310 in various embodiments. Noise filtering and image sharpening unit 400 may receive as input luminance image data 402 (e.g., a luminance value) for a given pixel at noise filtering and image sharpening unit 400 and chrominance image data 404 (e.g., chrominance values, Cb and Cr) for the given pixel. Noise filtering and image sharpening unit 400 may implement configurable spatial noise filter 420 to filter luminance image data 402. Luminance image data 402 may also be provided to sharpen unit 430 which may sharpen luminance image data 402 so that the sharpened image data maybe combined with filtered image data at 450. Chrominance noise filter 440 may be implemented as part of noise filtering and image sharpening unit to filter noise from chrominance image data 404. Filtering aggressiveness of chrominance noise filter 440 may be guided by luminance image data 402, as discussed in greater detail below with regard to FIG. 5.

Configurable spatial noise filter 420 may reduce noise by averaging neighbor pixels to a given pixel that are similar in brightness (e.g., determining the weighted average of pixel values that are geometrically and photometrically close to the given pixel). Consider the scenario where a pixel brightness difference between a given pixel and neighborhood pixels is low (e.g., the difference is below or within a noise threshold determined based on noise statistics that characterize the image sensor providing the image data). Filter 420 may thus smooth (or blur) the given pixel value with neighborhood pixel values (as the difference is likely caused by noise). In scenarios where the pixel difference is high (e.g., difference is above or outside the noise threshold), then filter 420 may not smooth or blur the given pixel value with neighborhood pixels (as the difference value is likely due to the signal, e.g., image content that includes edges or textures). As illustrated in FIG. 4, in some embodiments, configurable spatial filter 420 may perform noise filtering on luminance image data 402. However, in other embodiments, multiple colors components or channels of image data (e.g., RGB channels) may be filtered for noise at configurable spatial noise filter 420.

In at least some embodiments, configurable spatial noise filter 420 may utilize line buffer(s) 410 to provide spatial support 462 for performing noise filtering. Line buffer(s) 410 may be a memory or other kind of data storage accessible to configurable spatial noise filter 420 (e.g., via direct memory access (DMA) channels) to provide the values for pixels neighboring the given pixel that is being filtered at configurable spatial noise filter 420. For example, configurable spatial noise filter 420 may utilize a 5×5 filter (resulting in 25-taps) where a filter coefficient for each tap is adaptively changed based on a photometric similarity function at the neighborhood tap. Pixel values for the resulting 25 taps may be obtained from line buffer(s) 410.

Configurable spatial noise filter 420 may be programmed or directed to perform different filtering techniques or modes. For instance, in at least some embodiments, configurable spatial noise filter 420 may perform simplified bilateral filtering or non-local(NL)-means filtering. Configurable spatial noise filter 420 may apply a simplified bilateral filter by evaluating individual neighboring pixel values to determine the local filtering strength. When configurable spatial noise filter 420 is applying an NL-means noise filter, configurable spatial noise filter uses multiple neighboring patches of pixel values to increase filtering robustness. Additionally for the NL-means mode, the pixel difference may optionally be measured by taking the sum of absolute differences of a window around a given pixel (e.g., 3×3 window) against a window at a neighbor pixel (e.g., also 3×3 window). Then filter 420 uses the difference of the two neighboring patches to determine whether the difference is due to noise by comparing the difference to a noise threshold (as discussed above).

In at least some embodiments, configurable spatial noise filter 420 may implement spatial noise filtering without performing floating point math or accessing lookup tables, in various embodiments. Instead, filter 420 utilizes various combinations of adds, shifts, or a combination of adds and shifts to perform filtering. For example, taps for configurable spatial filter 420 may be computed based on adds or shifts (without floating point math or lookup tables) in order to determine filter tap values.

Picture sharpening increases texture and edge details for image data. However, care must be taken so that noise in image data is not detected as an edge and sharpened. Sharpen unit 430 may sharpen luminance image data 402 utilizing spatial support 462 provided by the same line buffer(s) 410 as for configurable spatial noise filter 420, which may include noise that has not yet been filtered by configurable spatial noise filter 420. Therefore, sharpen unit 430 may implement various techniques to distinguish between noise and edges in image data.

As noted earlier, sharpen unit 430 may receive as input luminance image data 402 for sharpening. Sharpen unit 430 may apply an unsharp mask filter to luminance image data 402. To apply the unsharp mask filter, a filtered value value (e.g., a low pass value or a band pass value) is subtracted from the given pixel's luminance value. The difference between the filtered value and the luminance value may represent a range of frequency data (e.g., high frequency data) in luminance image data 402 which may then be amplified in order to generate a sharpened luminance difference value for a given pixel (which may then be combined with a filtered luminance value at 450). This difference can also be computed in one filter stage by combining the filters and subtraction into one filter kernel. The amount to amplify the difference value (frequency range) may be determined according to a sharpening lookup table. For example, the difference value may be used to interpolate an amplified difference value (which may be the sharpened luminance value) according to one or more values in the lookup table. In at least some embodiments, the sharpening lookup table may have a set of values for a positive difference value and a different set of values for a negative difference value. In this way, sharpening response (e.g., the amount to amplify the difference value) can have a different sharpening response depending on whether the determined difference is positive or negative (even though the absolute value of the difference may be the same). The different sets of values for positive and negative differences in the lookup table for sharpening may be programmed in order to control sharpening in different scenarios (e.g., reducing sharpening strength in dark areas and increasing sharpening strength in light areas).

In some embodiments, multiple unsharp masks may be implemented, including, but not limited to, an unsharp mask that is the output (as illustrated in FIG. 4) of the configurable spatial noise filter 420 as described above or an unsharp mask that is the output of a symmetric linear filter (which may be implemented within sharpen unit 430) which may be subtracted from a dot-corrected version of luminance image data 402 (not illustrated). Generating the unsharp masks, and or any other technique implemented at sharpen unit 430 may utilize spatial support 462 from line buffer(s) 410 (e.g., for computing different taps for filters).

In order to be able to apply strong sharpening without introducing artifacts or amplifying noise, sharpened luminance values (as may be determined by the unsharp masks discussed above) may be modulated. In some embodiments, intensity-varying coring may be performed at sharpen unit 430 such that a different amount of coring may be applied. Coring may be applied to selectively remove sharpened values that may be identified as noise (e.g., the high frequency image data for a given pixel may be set to 0, removing any sharpening value to be combined at 450 with the spatially filtered version of the given pixel). Coring may be determined depending on a brightness level of the given pixel. As the standard-deviation of noise may vary significantly from one brightness level to another, it may be advantageous to apply coring based on the known behavior of the noise standard-deviation. For example, it may be advantageous to apply higher amounts of coring to dark areas of an image if it is known that dark areas have higher noise. Intensity-varying coring may be performed by interpolating the coring amount, subtracting the coring amount off of the sharpened value, and clipping negative values to zero. For example, if the sharpened value for a pixel is 20, and the coring amount is 10 and 20 exceeds the noise standard-deviation threshold (e.g., as discussed above), then 10 may be subtracted from 20 to given a cored brightness value for a pixel of 10.

In some embodiments, sharpen unit 430 may implement another modulation to prevent the introduction of artifacts and sharpening of noise, by interpolating gains to be applied to a sharpened value from an intensity-based global table to control selective sharpening based on intensity. For example, sharpening in dark areas of an image may be decreased as dark areas have lower signal-to-noise-ratio according to a gain interpolated from the table. Alternatively, interpolated gains may increase sharpening in bright regions even more (e.g., as pixels in highlight areas may be compressed during a global tone mapping stage such as gamma correction). The intensity-based global table may be programmed to avoid over-sharpening artifacts such as ringing or excessive overshoot.

In some embodiments, sharpen unit 430 may implement another modulation to prevent the introduction of artifacts and sharpening of noise, by modulating the sharpened value by other high-frequency signals. Sharpen unit 430 may be programmed or directed (e.g., by central control 320) to select a high-frequency signal to use for modulating the difference value. Modulation may be performed by interpolating the modulation amount based on the selected high-frequency signal. A lookup table may be implemented which contains the modulation amount based on the selected high-frequency signal. A variety of different high-frequency signals may be generated for modulation. In at least some embodiments, a Sobel filter may be applied to luminance image data 402 to generate a high-frequency signal used to modulate the sharpened value.

Output of sharpen unit 430 may be combined with the output of configurable spatial noise filter 420 to generate a filtered and sharpened version of the luminance image data 472 provided as output. For instance, if the sharpened version provides a luminance change value of +5 and the filtered version of the pixel has a luminance value of 10, then output 472 may be a filtered and sharpened luminance value for a given pixel of 15.

Please note that FIG. 4 is provided as merely an example of a noise filtering and image sharpening. Different combinations of the illustrated components (as well as components not illustrated) may be used for noise and image filtering. For example, different full color encodings of image data (e.g., RGB) may be received instead of separate luminance and chrominance image data. Thus, the components of FIG. 4 and their respective layout or ordering is not intended to be limiting to the various other combinations which may be used to implement noise filtering and image sharpening 400.

Figure 5:
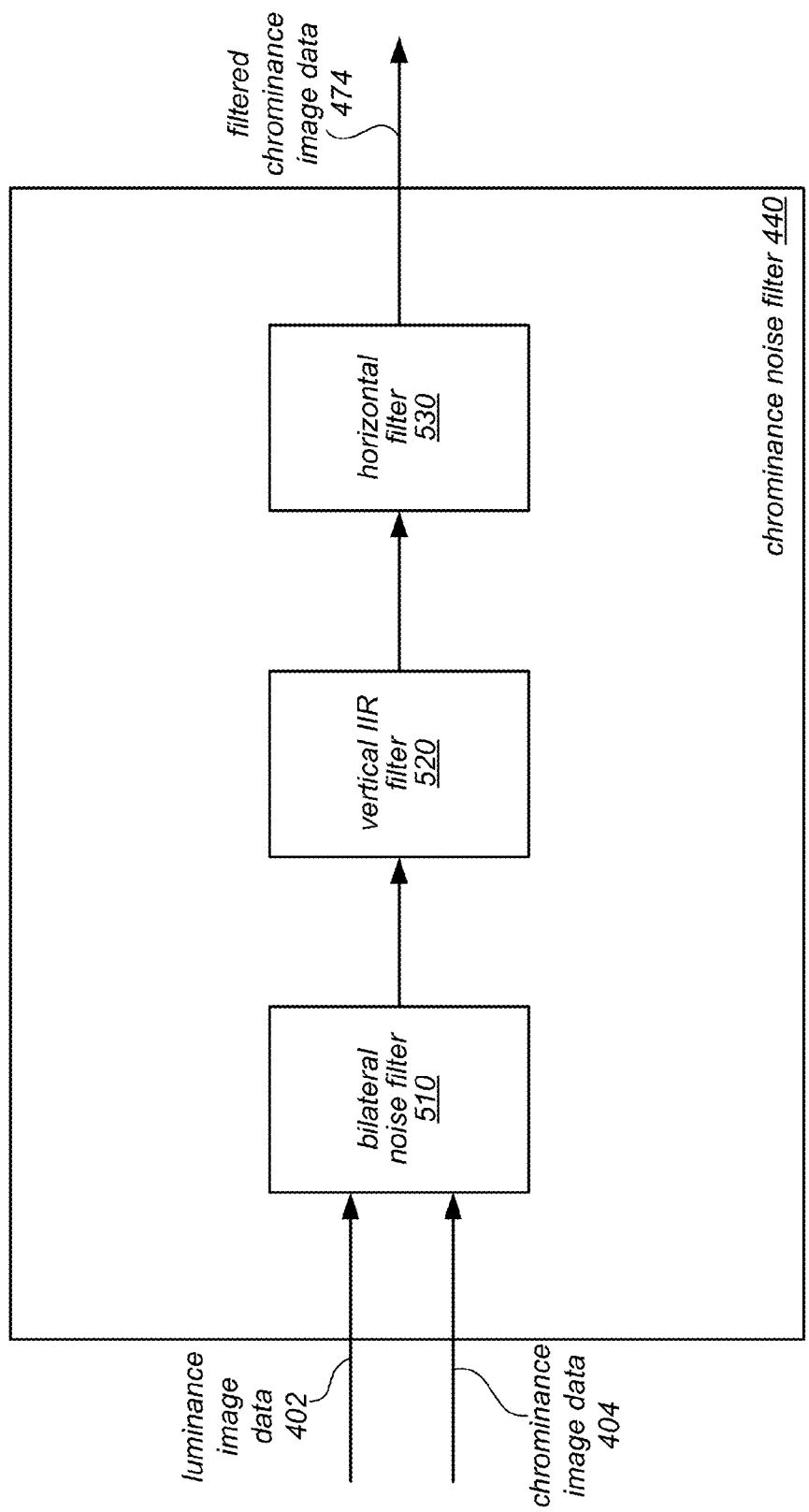
FIG. 5 is a logical block diagram illustrating an example chrominance noise filter, according to some embodiments.

FIG. 5 is a logical block diagram illustrating an example chrominance noise filter, according to some embodiments. Chrominance noise filter 440 may reduce noise in the chrominance channels 404 of image data. As chrominance channels typically have much lower signal-to-noise-ratio (SNR) than a luminance channel, chrominance noise filter 440 may provide additional noise filtering in the low light image scenarios. In at least some embodiments, chrominance noise filter 440 may implement noise filtering in three stages.

The first stage, bilateral noise filter 510, may perform 2D filtering. In at least some embodiments, luminance image data 402 may guide the aggressiveness of filtering the chrominance channel (e.g., so that chrominance image data may be filtered aggressively without over-smearing the color edges). The second stage, vertical infinite impulse response (IIR) filter 520, may perform 1D vertical filtering. Typically, chrominance image data includes large grains of noise that make the noise very difficult to remove. In streaming image processing architectures, the spatial support necessary to remove such large grains of noise may be prohibitive if FIR filters are solely used. A vertical IIR filter, such as vertical IIR filter 520, may perform similar filtering to remove large grains of noise with very small amounts of spatial support, such as line buffers, as the IIR feature amplifies the effectiveness of the provided spatial support such that the spatial support is effectively larger than what is actually provided to vertical IIR filter 520. The third stage, horizontal filter 530, may perform 1D horizontal filtering which may be combined with the output of vertical IIR filter 520 to generate a filtered version of chrominance image data 474. In this way, artifacts or other defects introduced by vertical IIR filter 520 into chrominance image data 520 may be reduced or removed (e.g., vertical smearing).

Bilateral noise filter 510 may receive as input chrominance image data 404 for filtering. Additionally, bilateral noise filter 510 may receive luminance image data 402 to guide the filtering of chrominance image data. In at least some embodiments, bilateral noise filter 510 may be implemented as a modified cross-bilateral filter in finite impulse response (FIR) fashion. Bilateral noise filter 510 may compute filter taps based on the intensity value differences determined from luminance image data 402. For example, when the difference values determined from luminance image data 402 are high, filtering strength of bilateral noise filter 510 may be reduced to avoid blurring edges.

An example summary of filtering performed by bilateral noise filter 510 is summarized below.

$$Cb_{out}(x, y) = \frac{\sum_{i,j} h(i, j)g_{Cb}(\Delta_Y, \Delta_{Cb}, \Delta_{Cr}, s(x, y))Cb_{in}(x-i, y-j)}{\sum_{i,j} h(i, j)g_{Cb}(\Delta_Y, \Delta_{Cb}, \Delta_{Cr}, s(x, y))}$$

$$g_{Cb}(\Delta_Y, \Delta_{Cb}, \Delta_{Cb}, s(x, y)) =$$

$$\text{box}\left(\frac{\lambda_Y \text{abs}(\Delta_Y) + \lambda_{Cb} \text{abs}(\Delta_{Cb}) + \lambda_{Cr} \text{abs}(\Delta_{Cr})}{s(x, y)}\right)$$

$$s(x, y) = k(Y(x, y), Cb(x, y))$$

Note that the summary is given for filtering a single chrominance channel (Cb). However, the same technique can be implemented to filter the other chrominance channel (Cr) as well. The filter kernel coefficients may be represented as h(i,j). Intensity differences may be represented as $\Delta_Y$ and $\Delta_{Cb}$, which may be the intensity differences between a given pixel, the center pixel (x,y), and neighboring pixels (x-i, y-j). The symbol s(x,y) represents a function of the noise standard deviation. A photo-similarity function which may reduce the filter kernel when the pixel differences are high may be represented as $g_{Cb}(\ )$. Another function may be represented as "box(a)" (whose value is 1 if 0<a<1 and zero otherwise). The weights that may control whether the luminance image data 402 or the chrominance image data 404 drives the filter-tap computation are represented as $\lambda_Y$, $\lambda_{Cb}$, and $\lambda_{Cr}$. For example, a higher value of $\lambda_Y$ than $\lambda_{Cb}$ or $\lambda_{Cr}$ means a luminance-guidance component may be stronger than a self-guidance component.

In at least some embodiments, larger filter support may be achieved in order to remove even larger grains in chrominance image data 404. A sparse filter, therefore, may be implemented. For example, inserting "0" s between kernel samples in bilateral noise filter 510 may enlarge the effective support of the filter 510.

Vertical IIR filter 520 may be implemented in various embodiments. Vertical IIR filter 520 may remove residual noise remaining in chrominance image data processed at bilateral noise filter 510. For example, vertical IIR filter 520 may remove residual noise in flat regions of image data filtered at bilateral noise filter 510. Vertical IIR filter 520 may implemented in many different ways to filter a given pixel in IIR fashion for color channel values, such as Cr and Cb. As an IIR filter, vertical IIR filter 520 utilizes previous filter output to determine a current filtered value, effectively increasing the spatial support used to generate the filtered value beyond the physically stored image data provided to vertical IIR filter 520.

Horizontal filter 530 may be implemented to remove residual noise remaining in chrominance image data in finite impulse response (FIR) fashion processed at bilateral filter 510 and vertical IIR filter 520. For instance, vertical streaks may be introduced (or remain) in image data processed at vertical IIR filter 520. Horizontal filter 530 may implement a 1D filtering technique which eliminates vertical streaks in the image data.

Figure 6:
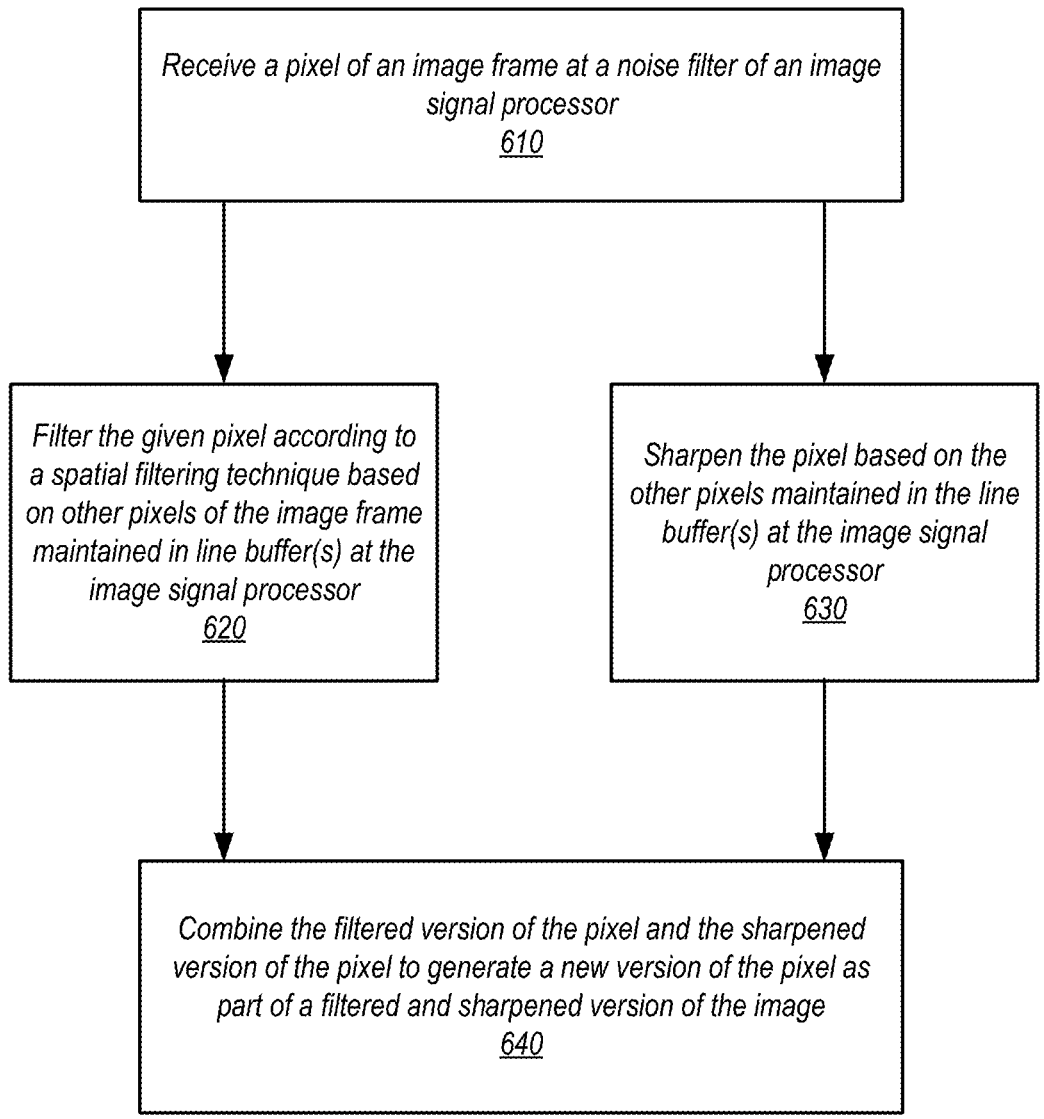
FIG. 6 is a high-level flowchart illustrating various methods and techniques for performing noise filtering and image sharpening utilizing common spatial support, according to some embodiments.

FIGS. 1-5 provide an example of an image processing pipeline, image signal processor, and system which may perform noise filtering and image sharpening utilizing common spatial support. However, numerous other types or configurations of systems or devices that implement an image processing pipeline and image signal processor may perform multi-rate processing for image data. FIG. 6 is a high-level flowchart illustrating various methods and techniques for performing noise filtering and image sharpening utilizing common spatial support, according to some embodiments. The various components described above may implement these techniques (in addition to those described with regard to FIG. 7 below) as well as various other image processing pipelines and image signal processors.

As indicated at 610, a pixel of an image frame may be received at a noise filter of an image signal processor for processing, in various embodiments. The pixel may be received in full color encoding (e.g., RGB or YCbCr). In some embodiments, a value for a channel of the full color encoding (e.g., the luminance channel) may be received separately from another value of the channel in the full color encoding (e.g., the chrominance channel) for the same pixel (e.g., separate memory interfaces, such as DMA channels may provide the channel data for a pixel separately to the temporal filter). In some embodiments, the techniques described below with regard to FIG. 6 may be performed with respect to a luminance channel value for a given pixel.

As indicated at 620, the given pixel may be filtered according to a spatial filtering technique based on other pixels of the image frame maintained in line buffer(s) at the image signal processor, in some embodiments. Spatial filtering techniques may determine differences between the given pixel and other pixels in the image frame. The differences may then be used to determine coefficient values. Coefficient values may be determined according to a photometric similarity function. The coefficient values may then be applied to the pixel values obtained from the line buffer to produce filter taps, which are then averaged (including the value of the given pixel). The weighted average of the pixels may then be provided as the filtered version of the given pixel. In some embodiments, the filtering of the pixel may be bypassed if the determined differences between the given pixel and the other pixels is above a noise threshold (indicating that the difference is likely caused by edges, textures, or other image content that is not noise). Line buffers may provide the values for the other pixels in order for the various comparisons to be made. In at least some embodiments, a bilateral filtering technique may be performed to generate the filtered version of the pixel. Bilateral filtering may determine the differences between the given pixel and the other pixel by determining the differences between a neighborhood of pixels surrounding the given pixel and the given pixel individually. In some embodiments, a non-local (NL) means spatial filtering technique may be performed which determines the differences between a sum of absolute differences between different windows of pixels, where one window includes the given pixel.

As indicated at 630, the pixel may be sharpened based on the other pixels maintained in the line buffer(s) at the image signal processor. Sharpening may be performed simultaneously or in near parallel with filtering, as indicated at 620. A frequency range of the pixel may be amplified, in various embodiments, by applying an unsharp mask to the pixel. Applying an unsharp mask may include subtracting a filtered value (which may be generated by applying one of the filtering techniques discussed above at 620 to the pixel or a symmetric linear filter to the pixel) from the luminance value of the pixel, The computed difference value may represent a frequency range (typically a high-frequency range) of the pixel which may be amplified in order to sharpen the pixel. In some embodiments, lookup tables or other programmable data structures may be accessed to interpolate the amplified difference value which may be the sharpened value of the pixel. Lookup tables may include different sets of values for sharpening which correspond to a positive or negative difference value.

In at least some embodiments, the sharpened value may be modified according to one or multiple modulation techniques. In this way, errors caused by over-sharpening may be avoided. In some embodiments, coring may be applied to reduce the sharpened value. A coring lookup table may be used to determine interpolate the amount to reduce the sharpened value. Another modulation technique may be to interpolate gain from an intensity-based global lookup table and apply the gain to the sharpened value. A high-frequency signal may also be applied to modulate the sharpened value, in some embodiments. For example, a Sobel filter may be applied to pixel values from the line buffer(s) to generate a high-frequency value. A lookup table may be then be implemented to interpolate a modulation amount to be applied to the sharpened value based on the generated high-frequency value.

As indicated at 640, once the filtered value for the given pixel and the sharpened value for the given pixel are determined, the values may be combined to generate a filtered version of the pixel. The filtered version of the pixel may be stored in a memory or output to another image processing unit in the image signal processor.

Figure 7:
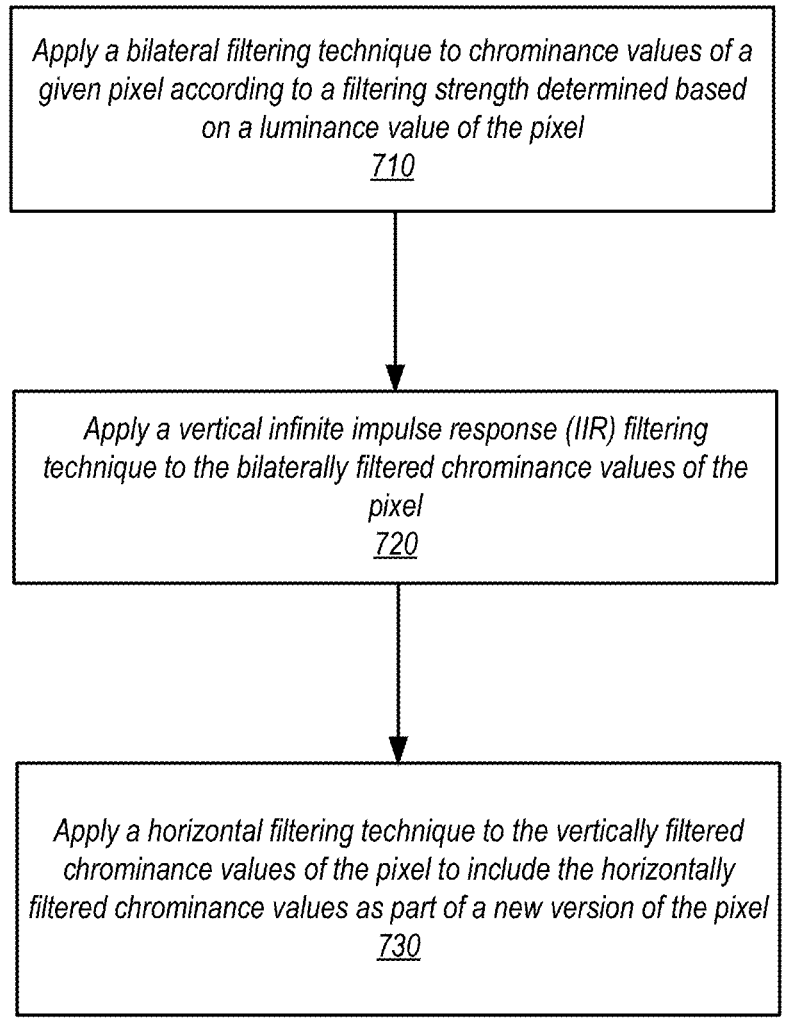
FIG. 7 is a high-level flowchart illustrating various methods and techniques for filtering noise in chrominance components of a given pixel, according to some embodiments.

Noise filtering may, in some embodiments, be performed on particular channel values of a pixel in order to apply different filtering techniques to different channels. While techniques described above with regard to FIG. 6 for multiple or all channels of a pixel, in at least some embodiments, remaining channels, such as chrominance channels Cb and Cr may also need to be filtered for noise. FIG. 7 is a high-level flowchart illustrating various methods and techniques for filtering noise in chrominance components of a given pixel, according to some embodiments.

As indicated at 710, a bilateral filtering technique may be applied to chrominance values of a given pixel. The bilateral filtering technique may perform spatial filtering similar to the general technique described above with regard to element 620 in FIG. 6 (by determining differences between the given pixel and other pixels in the image frame, determining corresponding coefficient values, which are then applied to the pixel values obtained from a line buffer—which may be the same or different than the line buffer—to produce filter taps, which are then averaged). In at least some embodiments, the filter taps may be determined based on intensity value differences determined from one or more luminance values of the image frame (including the luminance value of the given pixel). For example, when the difference values determined from luminance values in a neighborhood of pixels are high (e.g., exceeding a noise threshold), then the filtering strength applied may be reduced. Alternatively, if the difference values from luminance values in a neighborhood of pixels are low (e.g., within a noise threshold), then the filtering strength applied may be increased.

While bilateral filtering may remove a majority of noise in the chrominance values, additional noise filtering techniques may be performed. As indicated at 720, a vertical infinite impulse response (IIR) filtering technique may be applied to the bilaterally filtered chrominance values. The IIR fashion in which the vertical filter is applied may expand the kernel size of the filter to be much larger than the vertical spatial support supplied to the vertical IIR filter. Additionally, as indicated at 730, a horizontal filtering technique may be applied to the vertically filtered chrominance values. The horizontally filtered chrominance values may then be included as part of a new version of the pixel stored for a filtered image frame.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
    an image signal processor that comprises a noise filtering and image sharpening unit, wherein the image signal processor is configured to:
        receive, at the noise filtering and image sharpening unit, a luminance value for a pixel of an image frame in a luminance-chrominance encoding;
        apply, by the noise filtering and image sharpening unit, a spatial noise filtering technique to generate a filtered luminance value for the pixel, wherein spatial support for the spatial noise filtering technique is obtained from one or more line buffers at the image signal processor maintaining a plurality of other pixels of the image frame;

sharpen, by the noise filtering and image sharpening unit, a frequency range of the luminance value to generate a sharpened luminance value for the pixel, wherein spatial support to sharpen the frequency range is obtained from the one or more line buffers; and combine, by the noise filtering and image sharpening unit, the filtered luminance value and the sharpened luminance value of the pixel to generate a new version of the pixel as part of a noise filtered and sharpened version of the image frame.

2. The apparatus of claim 1, wherein the spatial noise filtering technique is a bi-lateral noise filtering technique.

3. The apparatus of claim 2, wherein the noise filtering and image sharpening unit is directed to apply a different spatial noise filtering technique for processing image data for another image frame, wherein the different spatial noise filtering technique is a non-local (NL) means filtering technique.

4. The apparatus of claim 1, wherein to sharpen the frequency range of the luminance value, the image signal processor is configured to access a lookup table to determine an amount to sharpen the frequency range, wherein the lookup table comprises a set of values for a negative difference determined as part of sharpening the frequency range and a different set of values for a positive difference determined as part of sharpening the frequency range.

5. The apparatus of claim 1, wherein to sharpen the frequency range of the luminance value, the image signal processor is configured to modulate an amount to sharpen the frequency range according to a gain interpolated from an intensity-based lookup table.

6. The apparatus of claim 1, wherein the image signal processor is further configured to:
receive, at the noise filtering and image sharpening unit, a plurality of chrominance values for the pixel;
apply, by the noise filtering and image sharpening unit, a bilateral filtering technique to the plurality of chrominance values of the pixel, wherein a filtering strength for the bilateral filtering technique is determined according to the luminance value of the pixel;
apply, by the noise filtering and image sharpening unit, a vertical infinite impulse response (IIR) filtering technique to the bilaterally filtered chrominance components of the pixel; and
apply, by the noise filtering and image sharpening unit, a horizontal filtering technique to the vertically filtered chrominance components of the pixel in order to include the horizontally filtered chrominance components of the pixel as part of the new version of the pixel generated as part of the filtered and sharpened version of the image.

7. The apparatus of claim 1, wherein the apparatus comprises a mobile computing device.

8. A method, comprising:
receiving a pixel of an image frame at an image signal processor for processing;
filtering, by the image signal processor, the pixel according a spatial noise filtering technique based on a plurality of other pixels for the image frame maintained in one or more line buffers at the image signal processor;
sharpening, by the image signal processor, the pixel based on the other pixels maintained in the line buffers at the image signal processor; and
combining, by the image signal processor, the spatially filtered version of the pixel and the sharpened version of the pixel to generate a new version of the pixel as part of a filtered and sharpened version of the image frame.

9. The method of claim 8, wherein the spatial noise filtering technique is a non-local (NL) means filtering technique.

10. The method of claim 8, wherein sharpening the pixel comprises modulating the sharpened version of the pixel.

11. The method of claim 10, wherein modulating the sharpened version of the pixel comprises modifying high-frequency data for the sharpened pixel according to an output of a Sobel filter applied to one or more of the other pixels maintained in the line buffers.

12. The method of claim 8, wherein the pixel is received in a luminance-chrominance encoding, and wherein the filtering, the sharpening, and the combining are performed with respect to a luminance value for the pixel.

13. The method of claim 8, further comprising:
applying, by the image signal processor, a bilateral filtering technique to a plurality of chrominance values of the pixel, comprising determining a filtering strength for the bilateral filtering technique according to the luminance value of the pixel;
applying, by the image signal processor, a vertical infinite impulse response (IIR) filtering technique to the bilaterally filtered chrominance components of the pixel; and
applying, by the image signal processor, a horizontal filtering technique to the vertically filtered chrominance components of the pixel in order to include the horizontally filtered chrominance components of the pixel as part of the new version of the pixel generated as part of the filtered and sharpened version of the image.

14. The method of claim 13, wherein the image signal processor is implemented as part of a mobile computing device and wherein the image frame is captured at an image sensor implemented as part of the mobile computing device.

15. A system, comprising:
a device configured to perform image processing, the device comprising:
a sensor interface configured to receive image data from an image sensor; and
an image processing pipeline that implements noise filtering and image sharpening circuitry, wherein the image processing pipeline is configured to:
receive, at the noise filtering and image sharpening circuitry, a pixel of an image frame for processing;
apply, by the noise filtering and image sharpening circuitry, a spatial noise filtering technique to the pixel to generate a filtered value of the pixel, wherein spatial support for the noise filter is obtained from one or more line buffers storing a plurality of other pixels of the image frame;
sharpen, by the noise filtering and image sharpening circuitry, a frequency range of the pixel to generate a sharpened value for the pixel, wherein spatial support to sharpen the frequency range is obtained from the line buffers; and
combine, by the noise filtering and image sharpening circuitry, the filtered value of the pixel and the sharpened value of the pixel to generate a new version of the pixel as part of a filtered and sharpened version of the image frame.

16. The system of claim 15, wherein the noise filtering and image sharpening circuitry is configured to apply one of a plurality of spatial noise filtering techniques, wherein the noise filtering and image sharpening circuitry is directed to perform the one spatial noise filtering technique for a given image frame, wherein the spatial noise filtering techniques comprise:
    a bilateral filtering technique; and
    a non-local (NL) means filtering technique.

17. The system of claim 15, wherein the image processing pipeline is configured to determine a plurality of taps for the spatial noise filtering technique without accessing a lookup table or without performing a floating point calculation.

18. The system of claim 15, wherein the pixel is received in a luminance-chrominance encoding, and wherein the application, the sharpen, and the combination are performed with respect to the luminance value of the pixel, and wherein the image processing pipeline is further configured to:
    apply, by the noise filtering and image sharpening circuitry, a bilateral filtering technique to a plurality of chrominance values of the pixel;
    apply, by the noise filtering and image sharpening circuitry, a vertical infinite impulse response (IIR) filtering technique to the bilaterally filtered chrominance components of the pixel; and
    apply, by the noise filtering and image sharpening circuitry, a horizontal filtering technique to the vertically filtered chrominance components of the pixel in order to include the horizontally filtered chrominance components of the pixel as part of the new version of the pixel generated as part of the filtered and sharpened version of the image.

19. The system of claim 18, wherein to apply the bilateral filtering technique, the image processing pipeline is configured to determine a filtering strength according to the luminance value, wherein the bilateral filtering technique is applied to the chrominance values according to the determined filtering strength.

20. The system of claim 15, wherein the system is a mobile computing device, and wherein the device is an image signal processor.

* * * * *